(12) United States Patent
Guthrie (10) Patent No.: US 7,768,954 B2
(45) Date of Patent: Aug. 3, 2010

(54) CONNECTING DEVICES TO A PEER-TO-PEER NETWORK

(75) Inventor: Brian J. Guthrie, Inverness (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 748 days.

(21) Appl. No.: 10/598,802

(22) PCT Filed: Mar. 2, 2005

(86) PCT No.: PCT/IB2005/050763

§ 371 (c)(1),
(2), (4) Date: Sep. 12, 2006

(87) PCT Pub. No.: WO2005/091572

PCT Pub. Date: Sep. 29, 2005

(65) Prior Publication Data

US 2007/0147334 A1    Jun. 28, 2007

(30) Foreign Application Priority Data

Mar. 17, 2004   (GB) .................................. 0406104.0

(51) Int. Cl.
*H04H 20/71* (2008.01)
(52) U.S. Cl. ..................................... 370/312; 370/338
(58) Field of Classification Search ................ 370/310, 370/338, 312, 346
See application file for complete search history.

(56) References Cited

U.S. PATENT DOCUMENTS 6,026,297 A * 2/2000 Haartsen .................. 455/426.1
6,252,884 B1 6/2001 Hunter
6,307,843 B1 10/2001 Okanoue
6,590,928 B1 * 7/2003 Haartsen ...................... 375/134
6,804,542 B1 * 10/2004 Haartsen ...................... 455/574
6,842,460 B1 * 1/2005 Olkkonen et al. ........... 370/465
6,901,057 B2 * 5/2005 Rune et al. .................. 370/310

(Continued)

FOREIGN PATENT DOCUMENTS

EP           1134940 A1       9/2001

(Continued)

OTHER PUBLICATIONS

Rendezvous layer protocols for Bluetooth-enabled smart device . Frank Siegemund Michael Rohs Pers Ubiquit Comput (2003) 7:91-101 DOI 10.1007/s00779-003-0233-z.*

(Continued)

*Primary Examiner*—Frank Duong (57) ABSTRACT

A communication device is arranged to delay a procedure for joining a network until it detects activity on the network, for example until the communication device is within range of network. In response to a positive detection of network activity, the communication device broadcasts its address to other communication devices already connected to the network. In response, a message containing a list of addresses of the other communication devices is sent by a selected one of the other communication device, for example, the one communication device that most recently joined the network. Each communication device is arranged to send a message once, so that only one message containing the address is sent to a communication device joining the network. If no network activity is detected, the communication device may continue to broadcast its address periodically at gradually increasing time intervals.

24 Claims, 5 Drawing Sheets

U.S. PATENT DOCUMENTS

| | | | |
|---|---|---|---|
| 7,164,885 B2 * | 1/2007 | Jonsson et al. | 455/41.2 |
| 7,356,347 B1 * | 4/2008 | Kammer | 455/517 |
| 7,398,327 B2 * | 7/2008 | Lee | 709/250 |
| 7,436,789 B2 * | 10/2008 | Caliskan et al. | 370/310.1 |
| 7,546,086 B2 * | 6/2009 | Hansson | 455/41.2 |
| 2003/0008674 A1 | 1/2003 | Cudak et al. | |
| 2003/0027526 A1 | 2/2003 | Hillyard | |

FOREIGN PATENT DOCUMENTS

| | | |
|---|---|---|
| JP | 10070552 A | 3/1998 |
| JP | 2001217846 A | 8/2001 |

OTHER PUBLICATIONS

Anonymous: "Remote Discovery of Bluetooth Devices."; Research Disclosure; Kenneth Mason Publications, Westbourne, GB., vol. 457, No. 71, May 2002.

Siegemundfrank, Rohs M.: "Rendezvous Layer Protocols for Bluetooth-Enabled Smart Devices."; Springer-Verlag, London, UK; 'Online!'; Jul. 2003, pp. 91-101.

* cited by examiner

CONNECTING DEVICES TO A PEER-TO-PEER NETWORK

The invention relates to a device and a method for use in a peer-to-peer network that is particularly suitable for, but not limited to, use in a ubiquitous network.

Ubiquitous and pervasive computing technology is aimed at providing an environment in which information or applications are available to a device regardless of time or physical location. It is envisaged that many hundreds of devices may be connected to a network at any time. The devices need not be computing devices of great complexity and may be embedded in objects. For example, a number of simple sensing devices comprising wireless transmitters could be attached to items in a warehouse. The sensing devices could then monitor environmental conditions and transmit output data via one or more networks during storage and transit of the item without interruption. Alternatively, a number of household appliances, such as lighting, heating or audio-visual appliances etc., may be connected to a network in order to allow their control from a remote location.

Recently, draft IEEE standard 802.15.4, known as the ZigBee standard, has been approved. According to this standard, a wireless communication device remains dormant until activated by a wakeup signal. As the device is not continuously active, its overall power consumption is reduced and its battery life may extend to months, or even years. This type of arrangement is especially useful for monitoring sensors and control applications where data is sent only intermittently.

A ZigBee network is managed by a mains-powered master device. A device joins the network by sending a request message to the master device. The master device stores all devices registered on the network in an address database. The devices connected to the network have no information regarding others device connected to the network, with the exception of the master device.

ZigBee networks are suitable for applications with low data rates. Where a higher data rate is required, a Bluetooth network for short-range wireless communication may be used. A Bluetooth network does not include a dedicated master device. Instead, the device setting up a connection performs the co-ordination functions of the master device for that particular connection. Similarly, where a Bluetooth device sets up a network, it may act as the master device for functions such as handling connection requests.

Both types of networks are usually set up by a user entering commands via a user interface on a device. If no dedicated master device is provided, problems may arise when a user of a designated master device is not present to manage the network. This drawback may be particularly marked where devices are only temporarily connected to the network. For example, it may be necessary to connect a mobile or portable device while it is present at a particular physical location and to disconnect that device when it leaves that location.

Moreover, in both types of network, with the exception of the master device itself, a device connected to the network cannot access any information regarding the other devices on the network. In an arrangement without a master device, such as a peer-to-peer network, information about the devices connected to the network must be disseminated.

In some prior networks, this dissemination is achieved by causing the nodes to repeatedly transmit information regarding their location and neighbouring nodes. For example, US2003/00027526 discloses a Bluetooth network in which nodes perform enquiries at random intervals. After being powered up, a wireless device broadcasts enquiries at random intervals in order to locate other nodes within its range. At least part of a time period between enquiries is used to scan for similar enquiries from other nodes. If an enquiry is received during such a scan, the wireless device transmits its address to the enquiring node. The enquiring node then pages the wireless device and a connection is established. This type of arrangement requires repeated broadcasting of location data. If changes in the configuration of the network are uncommon, for example, where nodes join or leave the network infrequently, a significant proportion of this data may remain unchanged. In this case, the repeated broadcast of this data may be redundant and wasteful of resources. Furthermore, this prior arrangement may suffer from significant delays. For instance, when the network is started up, it may be necessary to establish connections between a considerable number of nodes. This problem may be particularly significant in a ubiquitous network, as there may be hundreds of nodes to be connected to the network, requiring the transmission and reception of a large number of messages.

It is an object of the invention to provide a procedure for joining a network that does not require manual intervention from a user and transmits necessary data with greater efficiency, in order to reduce power consumption requirements and delays when a network is started up. It is a further aim to provide a device to embody the invention.

According to a first aspect of the invention, a communication device for transmitting data to and receiving data from one or more other communication devices via a network is arranged to respond to address information broadcast by a second communication device joining said network by determining whether a message containing address information relating to said one or more other communication devices has previously been forwarded from the communication device to any other of said one or more other communication devices and, if not, sending said message to the second communication device.

In this manner, the second communication device joining the network receives only one message containing address information for the one or more other communication devices connected to the network. For example, an embodiment of the invention may be arranged so that a communication device that joined the network most recently transmits the message to the second communication device.

As a result, the number of messages transmitted and received when a communication device joins the network may be reduced, compared to the prior art. The invention can be implemented in a manner that reduces the power consumed by the communication devices during this procedure. The reduction in the number of transmissions may also result in reduced delays when a network is started up.

Each device connected to the network may have the same configuration and functionality. A master device is not required.

The communication device may be arranged to operate in a first mode, in which the receiver is deactivated or operated at a lower power and activated in response to a detection of activity on the network.

This aspect further provides a system comprising a network and a plurality of said communication devices and a monitoring system comprising a plurality of communication devices, wherein one or more of the communication devices are equipped with sensing means. For example, a communication device with an environmental conditions sensor may be attached to an item in a warehouse and used to monitor the environmental conditions to which that item is subjected.

This first aspect also provides a method of disseminating address information from a communication device connected to a network, comprising receiving broadcast address information from a second communication device and, in response to said message, determining whether a message containing address information relating to one or more other communication devices connected to the network has previously been forwarded from the communication device to any other of said one or more other communication devices and, if not, sending said message to said second communication device.

According to a second aspect of the invention, a communication device comprises means for transmitting data over a network and means for receiving data via the network, configured to respond to a detection of activity on the network by: broadcasting address information of the communication device to one or more other communication devices and receiving a message sent from one of said other communication devices, the message comprising address information relating to said one or more other communication devices, and extracting said address information therefrom.

This procedure may be fully automated and the wireless device configured to perform it when it is switched on. As the number of messages received by the communication device when joining the network may be reduced when compared with the prior art, the invention can be implemented in a manner that reduces the power consumed by the receiving means of the communication device during such a procedure. The reduction in the number of transmissions may also result in reduced delays when a network is started up.

The communication device may be arranged so that, where no network activity is detected, the address information is automatically broadcast to any other communication devices that may be present. This avoids the connection of the communication device to the network being delayed when there is little or no network traffic. If no message is received in response to the broadcast, the address information may be rebroadcast periodically. Therefore, if the communication device is outside an area covered by the network, it can initiate its connection to the network when it enters this area without waiting for a positive detection of network activity. The communication device may be arranged to increase a period between successive rebroadcasts of its address information. This reduces the power required by the communication device if it is out of range of the network for a considerable period of time.

This aspect further provides a system comprising a network and a plurality of said communication devices and a monitoring system comprising a plurality of communication devices, wherein some or all of the communication devices are equipped with sensing means.

This second aspect also provides a method for connecting a communication device to a network, comprising detecting activity on the network and, in the event of an activity being detected, broadcasting address information of said communication device to one or more other communication devices connected to the network, receiving a message from one of said communication devices comprising address information relating to said one or more other communication devices and extracting said address information therefrom.

Embodiments of the invention will now be described with reference to the accompanying drawings, of which.

Figure 1:
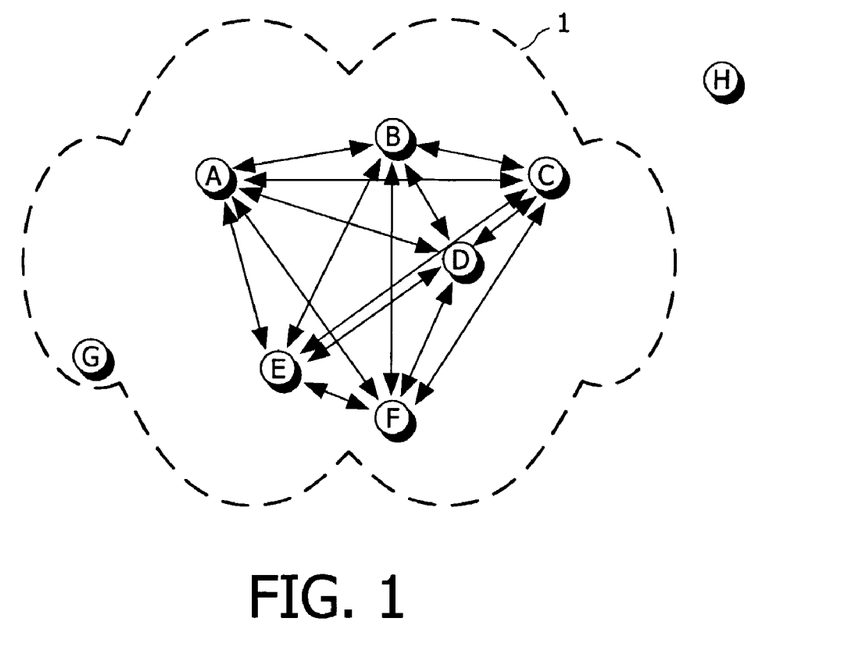
FIG. 1 shows a network comprising a plurality of nodes.

FIG. 1 shows a peer-to-peer network 1 comprising a plurality of nodes A-F. Each node A-F maintains a list of addresses of the nodes A-F connected to the network 1. Further nodes G, H are depicted, which are not yet connected to the network 1.

In this particular example, nodes B-H are communication devices attached to individual items in a warehouse and connected to a low-power ubiquitous radio network 1. The communication devices B-H are equipped with sensors for monitoring one or more environmental conditions, such as temperature, humidity, pressure, shock level and so on. The output from the sensors is transmitted to a communication device A for analysis, for example, in order to determine whether any of the monitored parameters exceeds predetermined thresholds.

Figure 2:
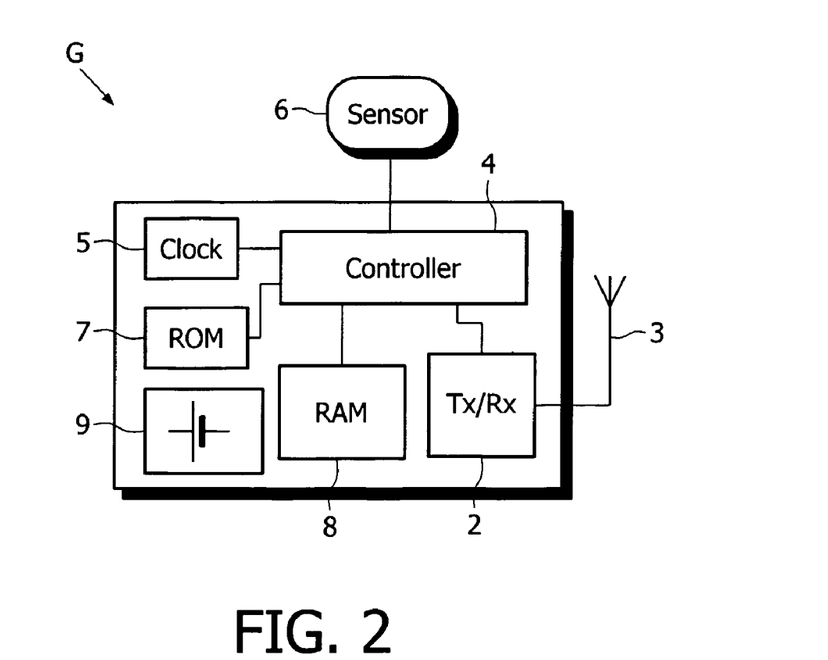
FIG. 2 is a block diagram showing the components of one of the nodes.

An example communication device G is shown in FIG. 2. The communication device G includes a transceiver 2 and antenna 3 for transmitting and receiving data over network 1. A controller 4, such as a microprocessor, and a clock 5 are provided for managing data transmission and reception processes and handling output from a sensor 6. The controller software is stored in a read-only memory 7, while other data, including data output from the sensor 6, is stored in random access memory 8. The communication device G is powered by a battery 9.

When connected to the network 1, the communication device G maintains a list of addresses of the other nodes A-F connected to a network 1. The addresses may be in the form of an Internet Protocol (IP) address, Media Access Control (MAC) address or other information that uniquely identifies each of the nodes A-F within that particular network 1. This list is stored in random access memory 8.

Figure 3:
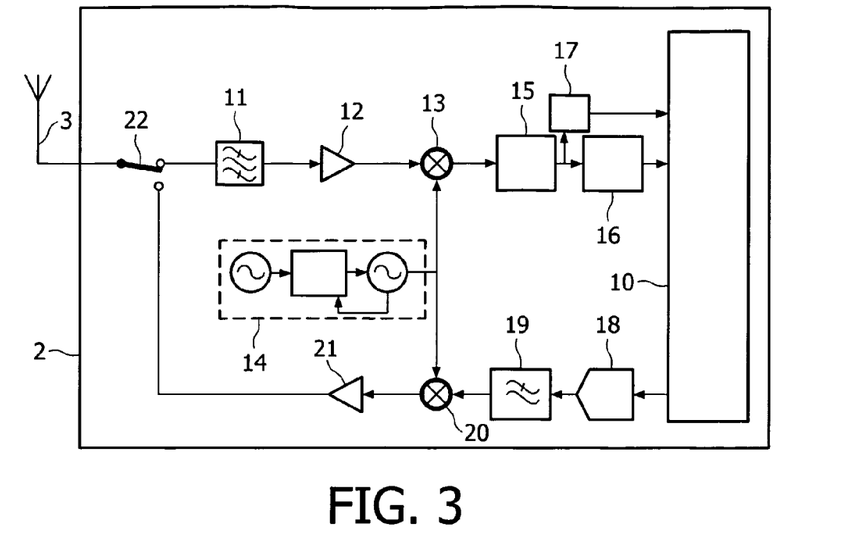
FIG. 3 is a block diagram of a transceiver within the node of FIG. 2.

The transceiver 2 is shown in more detail in FIG. 3 and comprises baseband processor 10, a receive chain comprising components 11 to 17 and a transmit chain comprising components 18 to 21.

Signals received by antenna 3 are passed through the receive chain. The receive chain comprises a filter 11, low noise amplifier 12 and a mixer 13, which downconverts the received signals to a baseband frequency using the output from a local frequency synthesiser 14. The downconverted signal is passed through a second filter 15 and split between a demodulator 16 and a received signal strength indicator (RSSI) 17. The outputs from the demodulator 16 and RSSI 17 are directed to the baseband processor 10.

In the transmit chain, data output by the baseband processor 10 is converted into an analogue signal by a DAC 18 and passed through a filter 19. The analogue signal is then upconverted by a mixer 20, using a signal from the local frequency synthesiser arrangement 14 and amplified by a power amplifier 21 before being transmitted by antenna 3.

The antenna 3 is selectively connected to the receive chain or transmit chain by a switch 22.

In this example, the other communication devices B-F and H have the same configuration as communication device G and the equivalent components of these communication devices B-F and H will be indicated using the reference numerals of FIGS. 2 and 3.

The operation of a communication device F connected to the network 1 will now be described with reference to part of FIGS. 4 and 5.

The communication device F can be operated in the following two modes. In the first mode, the transceiver 2 is deactivated. In other words, the transceiver is either operated at a low power or switched off. In the second mode, the transceiver 2 is fully activated in order to receive incoming data via the antenna 3.

In order to conserve power, the communication device F is operated primarily in the first mode (step s4.1). Periodically, following the expiry of a latency period t1 (step s4.2), the controller 4 will employ a carrier detection mechanism to determine whether there is any activity on the network 1 (step s4.3). In this example, the latency period t1 is 2 seconds. However, the different latency period t1 may be defined, depending on considerations such as estimated message rates on the network 1 and prior or current usage rates, within a range of, say, 10 ms to 100 s. For example, where it is expected that communication devices A-F are likely to transmit data every few minutes, the latency period t1 could be defined within a value of 1 to 10 s.

In order to detect the presence of a carrier signal on the network 1, part of the receive chain in transceiver 2 is switched on by activating the filters 11, 15, amplifier 12, mixer 13 and RSSI 17, along with the frequency synthesiser 14. As it is only the presence of a carrier signal that is being detected, it is not necessary to decode any received carrier signal at this stage. Therefore, in this example, the demodulator 16 remains deactivated while the baseband processor 10 is partially or fully activated as required. The presence of network activity is indicated by the output of the RSSI 17.

If there is no network activity, such as a message sent between two of the communication devices A-E or a message broadcast to all communication devices A-F connected to the network 1, the controller 4 returns the communication device F to the first mode of operation for a further latency period t1 (steps s4.1, s4.2) by switching off the baseband processor 10, filters 11, 15, amplifier 12, mixer 13, RSSI 17 and frequency synthesiser 14.

If traffic is present on the network 1 (step s4.3), the communication device F is switched into the second mode of operation by fully activating the transceiver 2 (step s4.4). In order to transmit a message to a node, for example, if communication device D is to send sensor output data to communication device A for analysis, the communication device D first transmits a wake up signal 23, shown in FIG. 5, addressed to communication device A. However, if the subsequent message is to be broadcast, the wake up signal 23 may contain a broadcast address instead. The wake up signal 23 is transmitted for a period of time equal to t1, in order to ensure that each communication device A-F has received the wake up signal. Therefore, communication device F detects the wake up signal 23 at step s4.3 and activates its transceiver 2 accordingly (step s4.4).

The communication device F determines whether the destination address of the wake up signal 23 matches either its own address or a broadcast address (step s4.5). If so, the transceiver 2 remains active and communication device F receives and decodes a subsequent message 24 (step s4.6). If, as in FIG. 5, the wake up signal 23 is not addressed to communication device F and does not contain a broadcast address, the transceiver is deactivated (step s4.7) and communication device F returns to the first mode of operation for a further latency period t1 (steps s4.1, s4.2) before checking again for network activity (step s4.3).

A procedure followed when a communication device G is connected to the peer-to-peer network 1 will now be described with reference to FIGS. 4, 5 and 6.

Figure 4:
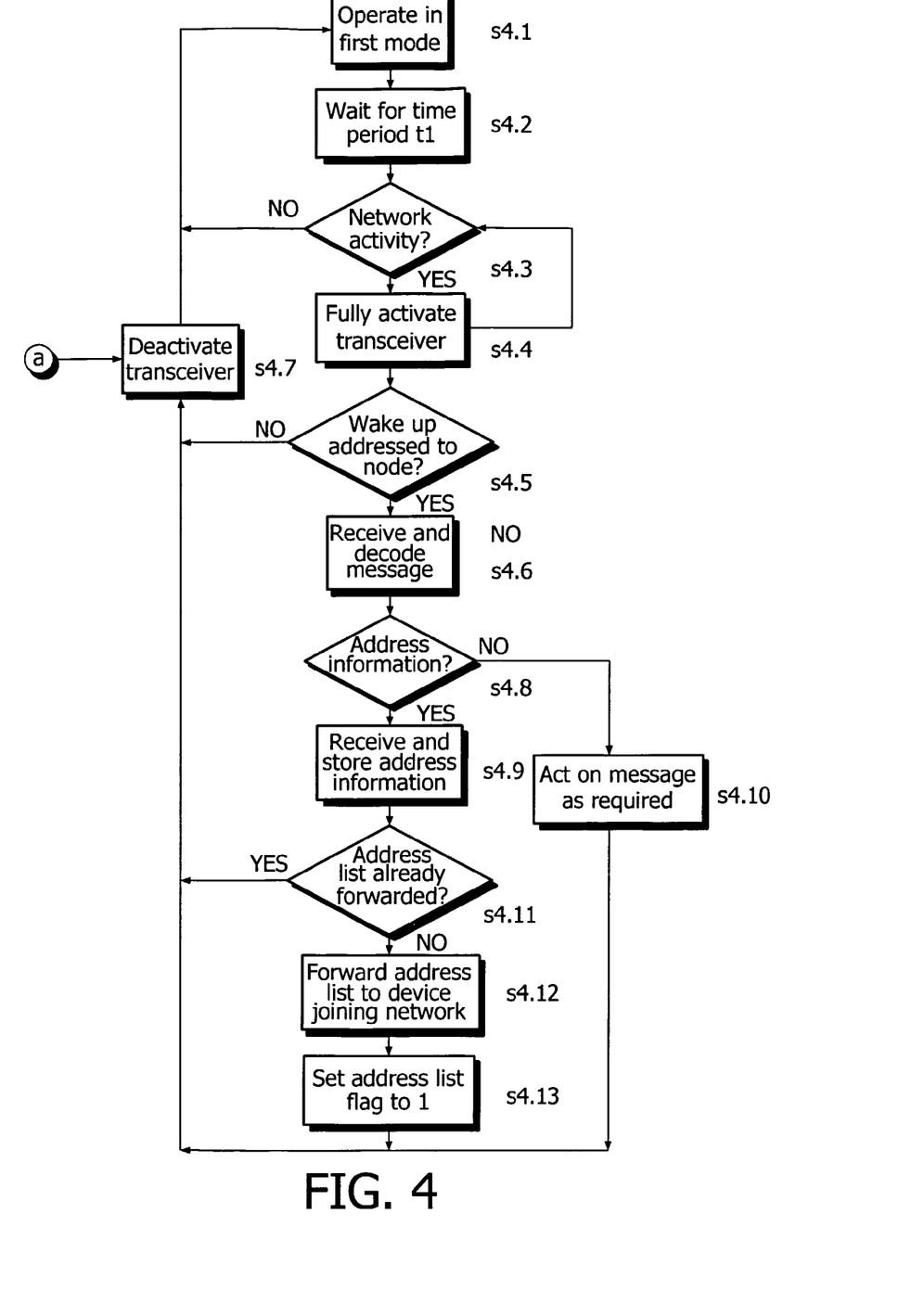
FIG. 4 is a flowchart of a procedure performed by a node when joining said network according to a first embodiment of the invention.
Figure 5:
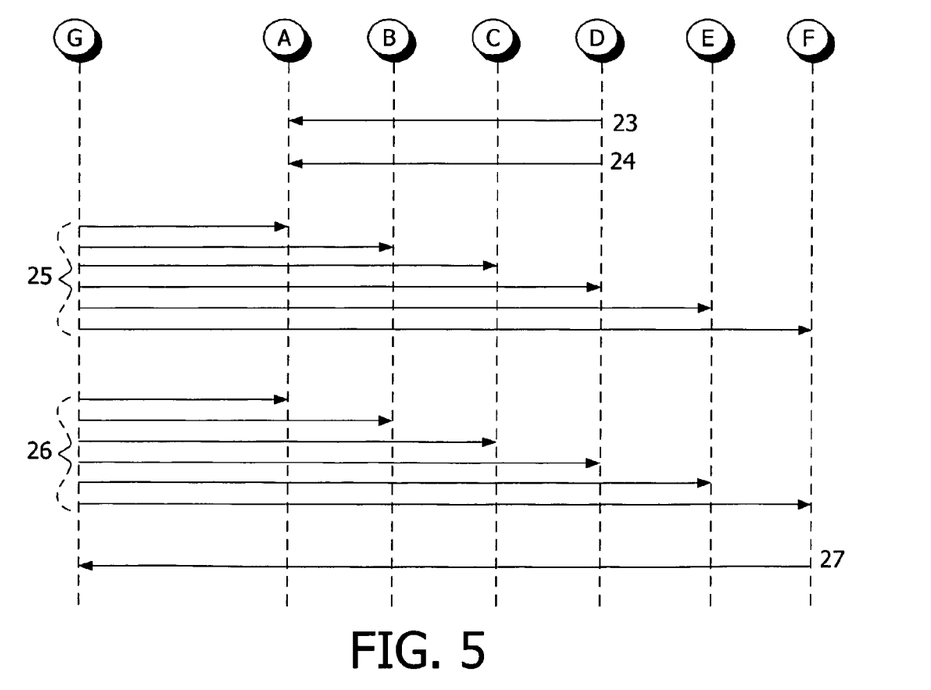
FIG. 5 depicts the transmission of messages between the nodes during the procedure shown in FIG. 4.

When powered on (step s6.1) communication device G operates in the first mode (step s6.2) for a time period t1 (step s6.3), after which it determines whether there is any activity on the network 1 (step s6.4) using a carrier detect mechanism as described in relation to FIG. 4. If there is no network activity, for example, if there is no traffic on network 1 or if communication device G is not located in an area covered by the network 1, the communication device G continues to operate in the first mode (step s6.2) and checks for network activity on expiry of further latency periods t1 (step s6.3, s6.4). If network activity is detected (step s6.4), the transceiver 2 within communication device G is fully activated (step s6.5).

In this particular example, the communication device G detects the wakeup signal 23 sent from communication device D to communication device A at step s6.4 and fully activates its transceiver 2 (step s6.5). The communication device G waits until the transmission of the subsequent message 24 from communication device D to communication device A is complete (step s6.6), before broadcasting a wakeup signal 25 to all communication devices A-F connected to the network 1 (step s6.7). The wakeup signal 25 has a duration that is at least equal to the latency period t1 in order to ensure that each communication device A-F can detect it and respond by activating their respective transceivers according to steps s4.1 to s4.5 described above.

The communication device G generates and broadcasts a message 26 containing its address (step s6.8). Each communication device A-F receives this message 26 and determines whether it is a message containing address information sent by a node joining the network 1 or another type of message (step s4.8). If it is determined that the message 26 is the former, each communication device A-F extracts the address information for communication device G and updates the address lists stored in their respective memory facilities 8 to include the extracted address information (step s4.9).

If a message received by a communication device A-F connected to the network 1 is another type of message, the received message is acted on accordingly (step s4.10) before deactivating its transceiver 2 (step s4.7) and returning to the first mode of operation for a further latency period t1 (steps s4.1 to 4.2). For example, if a message received by communication device F were a request from communication device A for sensor data, the communication device F would respond by sending the requested data (step s4.10) and then deactivates its transceiver 2 (step s4.7), return to the first mode of operation (step s4.1) and so on.

In step s4.9, the address list maintained by each node A-F is updated to include the address of communication device G. However, communication device G does not yet have access to address information for communication devices A-F. In order to reduce the number of messages transmitted when conveying this information to communication device G, the communication devices A-F are arranged to forward their respective address lists to another node once only. The address list contains or is associated with a flag that indicates whether or not it has been forwarded to any other communication device. In this particular example, a flag value of "0" indicates that the address list has not yet been forwarded to another node on its connection to the network 1, while a flag value of "1" indicates that the address list has been forwarded previously.

At step s4.11, each communication device A-F already connected to the network 1 uses the flag associated with the address list stored in its respective memory 8 to determine whether the address list has been forwarded previously. For example, if communication devices A-F joined the network 1 in alphabetical order, communication device A forwarded its address list to communication device B when communication device B joined the network 1. Communication device A then set its flag to indicate that its address list had been forwarded to another node and so did not forward its address list to any of communication devices C-F when they joined the network 1. Likewise, communication device B forwarded its address list to communication device C only and communication devices D and E would only have forwarded their address lists to communication devices E and F respectively. Therefore, in this example, the only communication device that has not previously forwarded its address list to any other node is communication device that joined the network 1 most recently, that is, communication device F.

As the flags stored in communication devices A-E indicate that their address lists have been forwarded previously (step s4.11), the transceivers 2 within these nodes A-E are deactivated (step s4.7) and they return to the first mode of operation for a further latency period t1 (steps s4.1, s4.2) before checking for further network activity (step s4.3).

Following step s4.11, communication device F transmits a message 27 containing its address list to communication device G (step s4.12) and sets the value of the flag to "1" (step s4.13), before returning to the first mode of operation for latency period t1 (steps s4.1, s4.2 and so on).

The address list is received by communication device G and stored in its memory 8 (step s6.9) with its flag set to "0" (step s6.10). Communication device G thereafter follows the procedure shown in FIG. 4, deactivating its transceiver 2 (step s4.7), returning to the first mode of operation for a latency period t1 (steps s4.1, s4.2) and so on.

Figure 6:
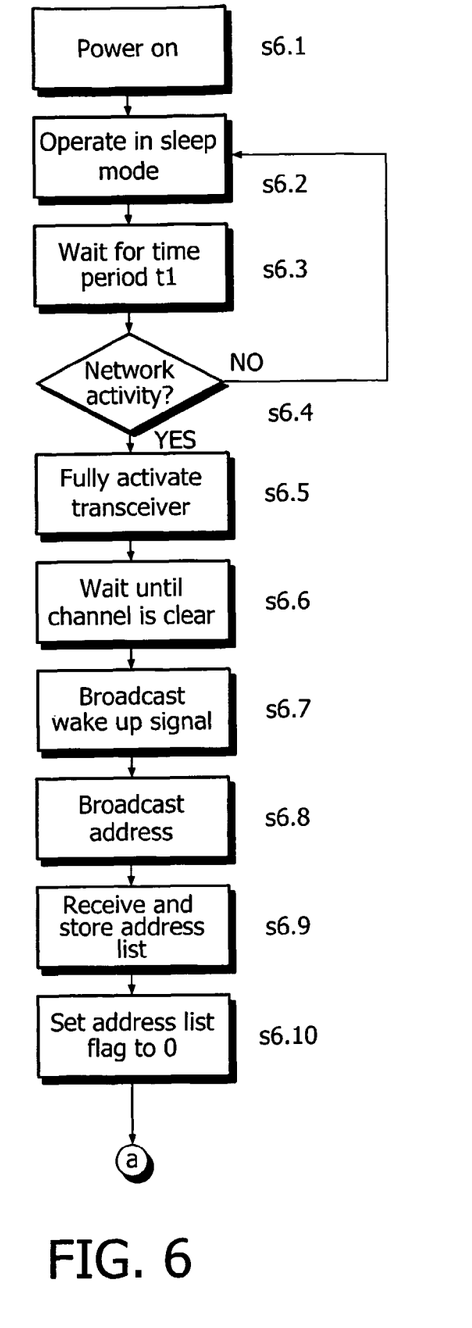
FIG. 6 is a flowchart of a procedure followed by a pre-existing node in the network.

Therefore, if another communication device H joins the network, following the procedure of FIG. 6, communication device G follows the procedure described above in relation to nodes A-F. A message 26 containing the address of communication device H is received and stored at step s4.9. At step s4.11, communication devices A-F will determine that their address lists have previously been forwarded, as indicated by their flags, which are set to "1". As the flag stored in communication device G has a value of "0", communication device G transmits a message 27 containing its address list and sets its flag to "1", to prevent the address list being forwarded from communication device G to any further communication devices that may join the network 1.

In the above described embodiment, a communication device G carries out periodic checks for network activity when powered on and delays broadcasting a message 26 containing its address to the communication devices A-F connected to the network 1 until it detects network activity 23. However, there may be little or no traffic detected at step s6.4, for a number of reasons. For instance, the communication device G may not be within an area of coverage of the network 1. If a communication device G is attached to an item to be stored in a warehouse, the communication device G may be switched on (step s6.1) when leaving a manufacturing facility. The communication device G may be out of range of the network 1 until the item reaches the warehouse and may make several periodic checks for network activity 23 before coming into range, thereby wasting resources. In addition, when the network is initially started up, if only one communication device A is connected to the network, there is no network traffic for detection by a second communication device B to be joined to the network 1 and neither communication device A, B is aware of the presence of the other. Also, the traffic volume in the network 1 may simply be very low. For example, in the monitoring system described above, transmission of sensor data from nodes B-F to communication device A may be infrequent and a considerable length of time may elapse before there is any activity 23 on the network 1 for a communication device G to detect. In each of these cases, communication devices B, G to be joined to network 1 continue to make periodic checks for network activity with little chance of a positive detection and their eventual connection to the network 1 may be delayed for a considerable time.

Figure 7:
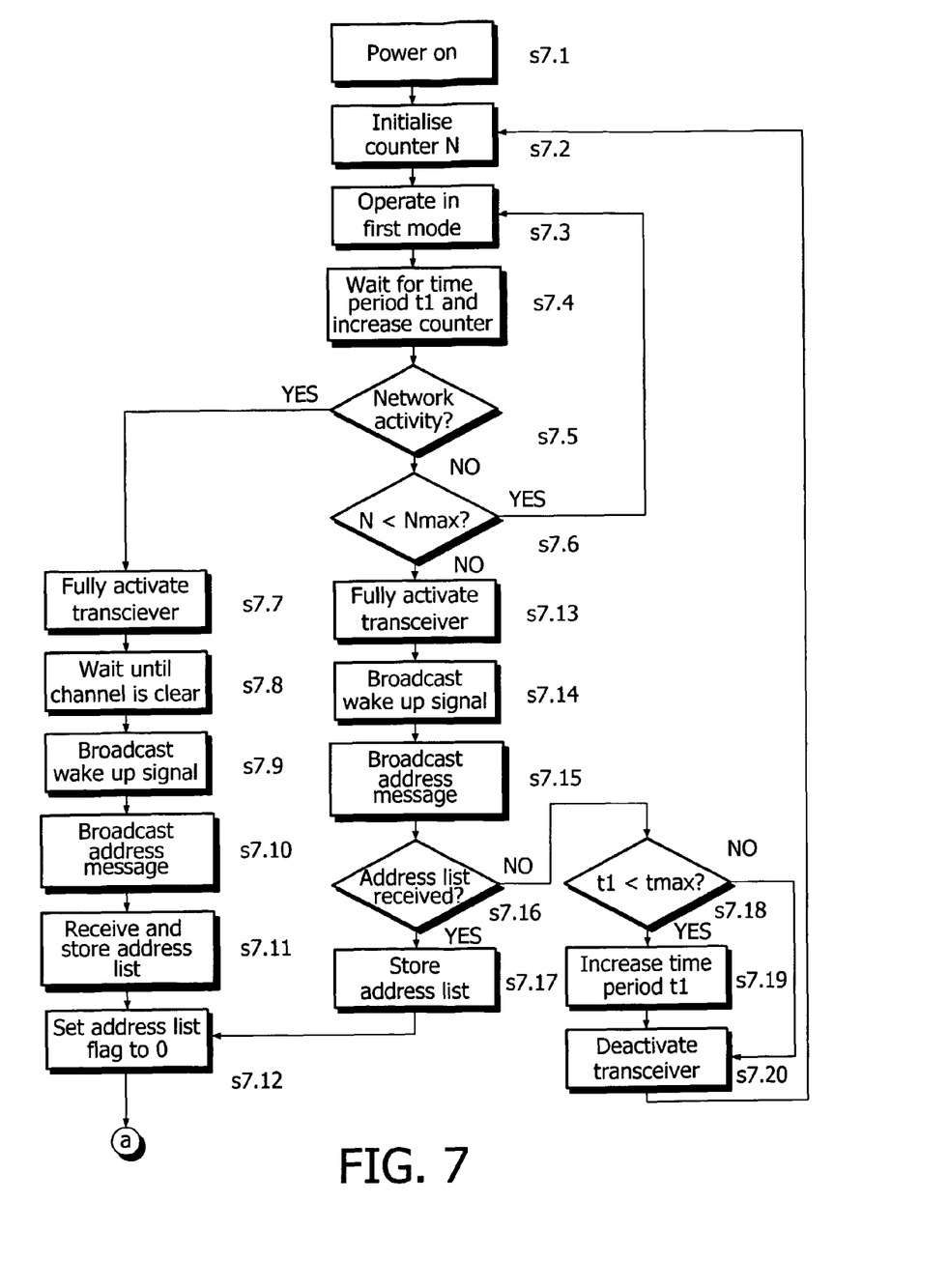
FIG. 7 is a flowchart of a procedure performed by a node when joining said network according to a second embodiment of the invention.

FIG. 7 depicts an alternative procedure for followed by a communication device G when joining a network 1 that is suitable for use where network traffic may be infrequent or where the communication device G is unlikely initially to be within an area covered by the network 1.

When the communication device G is powered on (step s7.1), its controller 5 initialises a counter, not shown, which counts the number N of elapsed latency periods (step s7.2). The latency period t1 is set with a length that is less than a maximum latency period tmax. The communication device G then operates in the first mode (step s7.3) and waits for a predetermined latency period t1 and increases the count N by 1 (step s7.4). The communication device G checks for network activity using a carrier detection mechanism as described in relation to FIG. 4 (step s7.4).

If network activity 11 is detected, the communication device G activates its transceiver 2 (step s7.7) and waits for the network to be clear of traffic (step s7.8), before broadcasting a wakeup signal 25 (step s7.9) over the network 1 for a time period of at least the length of the latency period t1, broadcasting a message 26 containing its address (step s7.10), receiving and storing a message 27 containing the addresses of the communication devices A-F connected to network 1 (step s7.11) and setting its associated flag accordingly (step s7.12), as described above in relation to steps s6.5 to s6.10 of FIG. 6. The communication device G follows the procedure shown in FIG. 4, deactivating its transceiver 2 (step s4.7), switching to operation in the first mode (step s4.1) and so on.

If no network activity is detected at step s7.5 and the number of elapsed latency periods N is less than a predetermined maximum Nmax (step s7.6), the communication device G continues to operate in the first mode (step s7.3) for another latency period t1, increases the count N by 1 (step s7.4) and performs another check for network activity (step s7.5).

If, at step s7.6, it is determined that N is equal to, or greater than, a maximum number Nmax of elapsed latency periods, the communication device G fully activates its transceiver 2 (step s7.13) and broadcasts a wakeup signal 25 to any communication devices A-F that may be connected to the network 1 (step s7.14). The wake up signal 25 is broadcast for a time period at least equal to the latency period t1. The communication device G then broadcasts a message 26 containing its address (step s7.15) and then waits for a predetermined time period t2, which is sufficient for any communication devices A-F present on the network 1 to receive and store its address (steps s4.6, s4.8 and s4.9) and for one communication device F to respond by transmitting a message 27 containing its address list (step s4.12).

If a message 27 containing an address list is received by the communication device G within time period t2 (step s7.16), the address list is stored (step s7.16) in memory 8 and its flag set to "0" (step s7.12). The communication device G then operates according to the procedure shown in FIG. 4, deactivating its transceiver 2 (step s4.7), returning to the first mode of operation (step s4.1) and so on.

However, if communication device G does not receive a message 27 containing an address list within time period t2 (step 7.16), the communication device G checks whether the latency period t1 is less than the maximum latency period tmax (step s7.17). If so, the latency period t1 is increased (step s7.18). The latency period t1 may be increased up to the maximum latency period tmax exponentially or, alternatively, by time intervals of fixed length. If the latency period t1 is not less than tmax (step s7.18), it remains unchanged. The transceiver 2 is then deactivated (step s7.19). The communication device G resets the counter N (step s7.2) and operates in the first mode (step s7.3) for a further latency period t1 (step s7.4) before repeating steps s7.5 to s7.15 and so on.

In this manner, if no network activity is detected for a predetermined number of latency periods Nmax, the communication device G broadcasts a wakeup signal 25 and a message 26 containing its address. If there is no response, the broadcast of the wake up signal 25 and the message 26 containing the address is repeated after another Nmax latency periods t1 have elapsed. As t1 is gradually increased, the broadcasts become more infrequent, with the interval between successive broadcasts rising to a maximum time interval of (Nmax×tmax).

For example, a communication device G attached to an item being transported to a warehouse would initially make frequent checks for network activity. If no network activity is detected, the communication device G begins to broadcast wakeup signals 25 and messages 26 so that, if it is within range of a network 1 with little or no traffic, its connection to the network is not further delayed. If there is no response to the broadcast signals, these are rebroadcast at gradually increasing time intervals so that, if the item moves within range of network 1 at the warehouse, the communication device G automatically joins the network 1.

If, in this example, Nmax is 600 and t1 is initially set at 2 s, the communication device G first broadcasts a wakeup signal 25 and message 26 containing its address when 20 minutes have elapsed without any detection of network activity 23. If no message 27 is received in response, the latency period t1 between checks for network activity 23 is progressively increased up to a value of tmax. Therefore, if tmax is 6 s, the maximum time interval between successive broadcasts is 1 hour. These values for Nmax, t1 and tmax are examples only and, in other embodiments of the invention, these parameters may be set to other values with regard to the characteristics and requirements of network 1 and/or communication device A-G.

If required, the steps of initialising, monitoring a counter and checking for network activity without automatically broadcasting a wakeup signal 25 and message 26 containing an address (steps s7.2, s7.5 to s7.11) may be omitted, so that the communication device G broadcasts wakeup signals 25 and messages 26 containing its address after each latency period t1 until it receives a message 27 containing an address list from another node F and successfully joins the network 1.

From reading the present disclosure, other variations and modifications will be apparent to persons skilled in the art. Such variations and modifications may involve equivalent and other features which are already known in the design, manufacture and use of communication devices and component parts thereof and in the configuration of peer-to-peer networks and which may be used instead of or in addition to features already described herein. For example, although the invention has been described using an example of a system for monitoring environmental conditions in a warehouse, the invention may be applied in other types of systems. These include low power radio systems, for example, other sensor data collection systems for medical/health monitoring, monitoring automated production processes, asset tracking and systems for monitoring or controlling home or office appliances, or for the connection of peripheral devices, such as a mouse, keyboard, printer, scanner and so on, to a computer, as well as games and toys.

It is not necessary for the communication devices connected to the network 1 may have the same capabilities and configuration. Furthermore, the communication devices A-H may be provided with configurations other than those shown in FIGS. 3 and 4. While the communication devices B-H described above comprise transceivers 2, the invention may be implemented in the form of, or using, communication devices with separate transmitter and receiver arrangements. In such an embodiment, the receiver is deactivated when the communication device is operated in the first mode.

The embodiments described above relate to connection of communication devices A-H to a low power ubiquitous radio network 1. If required, the network 1 may be a ZigBee network, a Bluetooth network, particularly when operated at a low level, or another type of short range wireless communication network.

In the procedure of FIG. 7, a communication device G broadcasts a message 26 containing its address after Nmax latency periods t1 have elapsed. In a further embodiment of the invention, the communication device G may be configured differently so that, for example, a period longer than Nmax latency periods t1 elapses before steps s7.13 to s7.15 are performed. For example, in a warehouse monitoring system, if it is known that an item to which the communication device G is attached will be in transit for a given time, the first broadcast of the message (26) containing its address information may be further delayed until a greater number of latency periods Nmax' has elapsed.

In the procedure shown in FIG. 7, after broadcasting the message 26 containing its address (step s7.15), the communication device G waits to receive an address list (step s7.16). However, communication device F may be arranged so that it sends an acknowledgement for the message 26 to communication device G before forwarding the message 27 containing its address list. The communication device F may determine whether an acknowledgement is to be sent based on whether it has acknowledged a message 26 from another communication device previously, for example, using the flag associated with its address list. On receipt of the acknowledgement, communication device G may be arranged to continue operating in the second mode, with its transceiver 2 activated, until the address list is received.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A communication device for transmitting data to and receiving data from one or more other communication devices via a peer-to-peer network, wherein the communication device comprises:
   means for responding to address information broadcast by a second communication device joining said network;
   means for determining whether a message containing address information relating to said one or more other communication devices has previously been forwarded from the communication device to any other of said one or more other communication devices, and means for sending said message to the second communication device depending on the determination that such message has not previously been forwarded.

2. A communication system comprising a network and a plurality of communication devices according to claim 1.

3. A communication device according to claim 1, further comprising a sensor and means for generating and transmitting data based on the output of the sensor via the network.

4. A communication device according to claim 3, wherein said sensor is arranged to monitor one or more environmental conditions.

5. A monitoring system comprising a plurality of communication devices according to claim 3.

6. A communication device of claim 1, configured for use in a Bluetooth network.

7. The communication device according to claim 1, operable in a first mode, in which a receiver is inactive, and in a second mode, in which the receiver is activated in order to receive data from said one or more other communication devices and arranged to switch from the operating in the first mode to operating in the second mode in response to a detection of activity on the network.

8. The communication device according to claim 7, configured to respond to said detection of activity on the network by determining if said activity comprises one of a wakeup signal addressed to the communication device or a broadcast wakeup signal and, if so, continuing to operate in said second mode to receive a further message.

9. A communication device according to claim 1, configured for use in a ubiquitous radio network.

10. A communication device according to claim 1, configured for use in a ZigBee network.

11. A communication device comprising:
means for transmitting data over a peer-to-peer network; and
means for receiving data via the network;
controller means configured to respond to a detection of activity on the network by:
broadcasting address information of the communication device to one or more other communication devices; and
receiving a message sent from only one networked device of said other communication devices, the message comprising address information relating to said one or more other communication devices and extracting said address information therefrom, wherein said one networked device has not previously forwarded the message to any other of said one or more other communication devices.

12. The communication device according to claim 11, wherein the controller means is configured to respond to the broadcast of address information from a further communication device by determining whether a message containing address information relating to said one or more communication devices has been sent by the communication device to another communication device previously and, if not, sending said message to said further communication device.

13. The communication device according to claim 11, wherein the controller means is configured to broadcast address information to said one or more other communication devices if no network activity is detected.

14. The communication device according to claim 13, wherein the controller means are arranged so that, if no message is received in response to the broadcast of address information, the address information is rebroadcast periodically.

15. The communication device according to claim 14, wherein the controller means are arranged to increase a period between successive broadcasts of the address information.

16. A method of disseminating address information in a peer-to-peer network from a communication device connected to the network, comprising:
receiving a message containing broadcast address information from a second communication device; and,
in response to said message, determining whether the message containing address information relating to one or more other communication devices connected to the network has previously been forwarded from the communication device to any other of said one or more other communication devices and, if not, sending said message to said second communication device.

17. The method according to claim 16, comprising:
operating the communication device in a first mode, in which a receiver within the communication device is inactive; and
switching to operating the communication device in a second mode, in which the receiver is activated in order to receive data from said one or more other communication devices in response to a detection of activity on the network.

18. The method according to claim 17, comprising, in response to detection of activity on the network, determining whether said activity comprises one of a wakeup signal addressed to the communication device or a broadcast wakeup signal and, in response to a positive determination, continuing to operate in said second mode to receive a further message.

19. The method according to claim 16, further comprising receiving output from a sensor and generating and transmitting via the network data based on said output.

20. A method for connecting a communication device to a peer-to-peer network, comprising:
detecting activity on the network; and
in the event of an activity being detected, broadcasting address information of said communication device to one or more other communication devices connected to the network, receiving a message from only one networked device of said communication devices comprising address information relating to said one or more communication devices and extracting said address information therefrom, wherein said one networked device has not previously forwarded the message to any other of said one or more other communication devices.

21. The method according to claim 20, comprising:
in response to broadcast of address information from a further communication device, determining whether a second message containing information relating to said one or more communication devices has been forwarded by the communication device to any other communication device and, if not, sending the second message to said further communication device.

22. The method according to claim 20, comprising, if no network activity is detected, broadcasting the address information to said one or more other communication devices.

23. The method according to claim 22, comprising, if no message is received following the broadcast of address information, rebroadcasting the address information periodically.

24. The method according to claim 23, comprising increasing a period between successive broadcasts of the address information.

* * * * *